(12) United States Patent
Rasanen et al.

(10) Patent No.: US 11,172,460 B2
(45) Date of Patent: Nov. 9, 2021

(54) USER LOCATION MONITORING IN MOBILE EDGE ENVIRONMENT

(71) Applicant: Nokia Technologies Oy, Espoo (FI)

(72) Inventors: Juha Antero Rasanen, Espoo (FI); Pekka Kurre, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/462,135

(22) PCT Filed: Nov. 18, 2016

(86) PCT No.: PCT/US2016/062750
§ 371 (c)(1),
(2) Date: May 17, 2019

(87) PCT Pub. No.: WO2018/093380
PCT Pub. Date: May 24, 2018

(65) Prior Publication Data
US 2019/0335414 A1   Oct. 31, 2019

(51) Int. Cl.
*H04W 64/00*   (2009.01)
*H04W 8/10*   (2009.01)
*H04W 68/02*   (2009.01)

(52) U.S. Cl.
CPC ............ *H04W 64/00* (2013.01); *H04W 8/10* (2013.01); *H04W 68/02* (2013.01)

(58) Field of Classification Search
CPC ....... H04W 64/00; H04W 8/10; H04W 68/02; H04W 60/00; H04W 60/04
(Continued)

(56) References Cited

U.S. PATENT DOCUMENTS 8,254,968 B2 * 8/2012 Koo ...................... H04W 60/00
  455/458
8,606,244 B2   12/2013 Claussen et al.
(Continued)

FOREIGN PATENT DOCUMENTS

WO   WO 2016128055   8/2016

OTHER PUBLICATIONS

Cho, Junguk, et al., "ACACIA: context-aware edge computing for continuous interactive applications over mobile networks." Proceedings of the 12th International on Conference on emerging Networking Experiments and Technologies. ACM, 2016 (pp. 375-389). (Year: 2016).*
(Continued)

*Primary Examiner* — Farid Seyedvosoghi
(74) *Attorney, Agent, or Firm* — Mintz Levin Cohn Ferris Glovsky and Popeo, P.C.

(57) ABSTRACT

Methods and apparatus, including computer program products, are provided for mobile edge computing. In one aspect there is provided a method. The method may include receiving, for at least one user equipment, in indication of a tracking area update and/or an attachment to a radio access network; providing the indication about the at least one user equipment to at least a first mobile edge computing server and/or at a first mobile edge platform, the indication provided via a shared database and/or via signaling between the apparatus and at least the first mobile edge computing server and/or the first mobile edge platform; and receiving, from a mobile edge application, a request for location information for at least one user equipment in a zone covered by the apparatus. Related apparatus, systems, methods, and articles are also described.

21 Claims, 6 Drawing Sheets

(58) Field of Classification Search
USPC .............................................. 455/456, 456.2
See application file for complete search history.

(56) References Cited

U.S. PATENT DOCUMENTS

| | | | |
|---|---|---|---|
| 9,144,050 B2 | 9/2015 | Olsson et al. | |
| 2001/0009544 A1* | 7/2001 | Vanttinen | H04W 64/00 370/338 |
| 2007/0042776 A1* | 2/2007 | Bakshi | H04W 52/0219 455/435.1 |
| 2010/0234019 A1* | 9/2010 | Zhang | H04W 8/04 455/432.1 |
| 2011/0134838 A1 | 6/2011 | Russell et al. | |
| 2011/0294506 A1* | 12/2011 | Claussen | H04W 8/10 455/435.1 |
| 2012/0040700 A1* | 2/2012 | Gomes | H04W 8/186 455/500 |
| 2012/0088521 A1* | 4/2012 | Nishida | H04W 64/006 455/456.1 |
| 2012/0140743 A1* | 6/2012 | Pelletier | H04W 76/28 370/335 |
| 2015/0055623 A1 | 2/2015 | Li et al. | |
| 2015/0080022 A1* | 3/2015 | Gustafsson | H04W 68/02 455/456.1 |
| 2015/0282115 A1* | 10/2015 | Pitt | H04W 64/006 455/456.1 |
| 2015/0365789 A1 | 12/2015 | Salot et al. | |
| 2018/0270720 A1* | 9/2018 | Shi | H04L 12/28 |

OTHER PUBLICATIONS

3GPP, "Technical Specification Group Services and System Aspects; General Packet Radio Service (GPRS) enhancements for Evolved Universal Terrestrial Radio Access Network (E-UTRAN) access (Release 14)," 3GPP TS 23.401, V14.1.0, Sep. 26, 2016, (379 pages).

Cho, Junguk, et al., "ACACIA: context-aware edge computing for continuous interactive applications over mobile networks." Proceedings of the 12th International on Conference on emerging Networking EXperiments and Technologies. ACM, 2016 (pp. 375-389).

ZTE Corporation, "Mobile edge host located on S1Use case," ETSI Draft; MEC (16)000187, European Telecommunications Standards Institute, May 13, 2016, pp. 1-3.

www.3gpp.org, 2016, $3^{RD}$ Generation partnership project, technical specification group services and system aspects; general packet radios service (GPRS) enhancements for evolved universal terrestrial radio access network (E-UTRAN) access, Release 14, 3GPP TS 23.401, 2016, 379 pages, v. 14, No. 1.0.

European Communication under Rule 71(3) EPC for Application No. 16816028.1-1231, dated Nov. 23, 2020, (39 pages).

* cited by examiner

USER LOCATION MONITORING IN MOBILE EDGE ENVIRONMENT

CROSS REFERENCE TO RELATED APPLICATIONS

This application is a national-phase entry of Patent Cooperation Treaty Application No. PCT/US2016/062750 filed Nov. 18, 2016, entitled "USER LOCATION MONITORING IN MOBILE EDGE ENVIRONMENT," the contents of which are hereby incorporated by reference in their entirety.

FIELD

The subject matter described herein relates to wireless.

BACKGROUND

Standards are being developed to enable application including cloud-based applications to be moved close to the edge of the cellular network including the radio access network. It is believed that such a move may reduce congestion and latency and/or improve overall performance and experience. To that end, a series of standards related to mobile edge computing (MEC) are being developed. For example, ETSI has promulgated certain requirements, specifications, and the draft feature specifications including: ETSI GS MEC 002 "Mobile-Edge Computing; Technical Requirements" (version 1.1.1/March 2016); ETSI GS MEC 003 "Mobile-Edge Computing; Framework and Reference Architecture" (version 1.1.1/March 2016); Draft ETSI GS MEC 013 "Mobile-Edge Computing; Location Service API" (version 0.1.2/July 2016, hereinafter "MEC location service"); Draft ETSI GS MEC 012 "Mobile-Edge Computing; Radio Network Information API" (version 0.2.4/2016-07); and/or the like (the standards collectively referred to as the MEC standards).

SUMMARY

Methods and apparatus, including computer program products, are provided for mobile edge computing.

In some example embodiments, there is provided a method. The method may receiving, for at least one user equipment, in indication of a tracking area update and/or an attachment to a radio access network; providing the indication about the at least one user equipment to at least a first mobile edge computing server and/or at a first mobile edge platform, the indication provided via a shared database and/or via signaling between the apparatus and at least the first mobile edge computing server and/or the first mobile edge platform; and receiving, from a mobile edge application, a request for location information for at least one user equipment in a zone covered by the apparatus.

In some variations, one or more of the features disclosed herein including the following features can optionally be included in any feasible combination. A mobile network identifier may be determined from an identifier included in the request for location information. The identifier may include an anonymous customer reference and/or a category identifier. The mobile network identifier may include an international mobile subscriber identifier, a mobile station international subscriber directory number, and/or an international mobile equipment identity. The request from the mobile edge application may include a query for, and/or a subscription to, the location information about the at least one user equipment. The request for location information may include a defined zone and/or a defined access point to limit the request for location information to the at least one user equipment in the defined zone and/or connected to the defined access point. The request for location information may include a format for the location information provided to the mobile edge application. A page may be initiated to the at least one user equipment in the zone covered by the apparatus. A page may be initiated to some, and/or all, of the at least one user equipment in the zone covered by the apparatus. One or more user equipment may be excluded from the page when the one or more user equipment are likely to be outside of the zone. The initiation of the page may be delayed to enable at least one other mobile edge application to request location information. The page initiation may include requesting the page from a mobility management entity and/or requesting the page from at least one base station in the zone covered by the apparatus. The page may indicate a way to respond to the page, wherein the way may include at least an identifier for the at least one user equipment, the location information, and/or a time stamp. The location information for the at least one user equipment may be received in response to the page. An anonymous customer reference and/or a category identifier may be determined from a mobile network identifier included in the response to the page. The location information for the at least one user equipment may be provided to the mobile edge application, wherein the location information may be determined based on the response to the page. A second mobile edge computing server may be configured to at least receive the indication, provide the indication, and/or receive the request, wherein the second mobile edge computing server includes a second mobile edge platform. The second mobile edge computing server may include a plurality of mobile edge applications including the mobile edge application. The request for location information may specify all user equipment in the zone, some user equipment in the zone, and/or a class of user equipment in the zone. The second mobile edge computing may include a first interface to at least one base station and/or a second interface to a mobility management entity.

In some aspects, a method may be provided that includes providing, via an interface to a mobile edge computing server, an indication representative of a tracking area update from a user equipment and/or an indication representative of an attachment to a radio access network by the user equipment; providing, to mobile edge computing server an identity of the user equipment and location information for the user equipment; and initiating, in response to a page request from the mobile edge computing server, a page of the user equipment.

In some variations, one or more of the features disclosed herein including the following features can optionally be included in any feasible combination. The identity of the user equipment and the location information for the user equipment may be provided, in response to the page request, to the mobile edge computing server. The interface may include a radio network information service interface. The apparatus may be associated with a zone of the mobile edge computing server.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
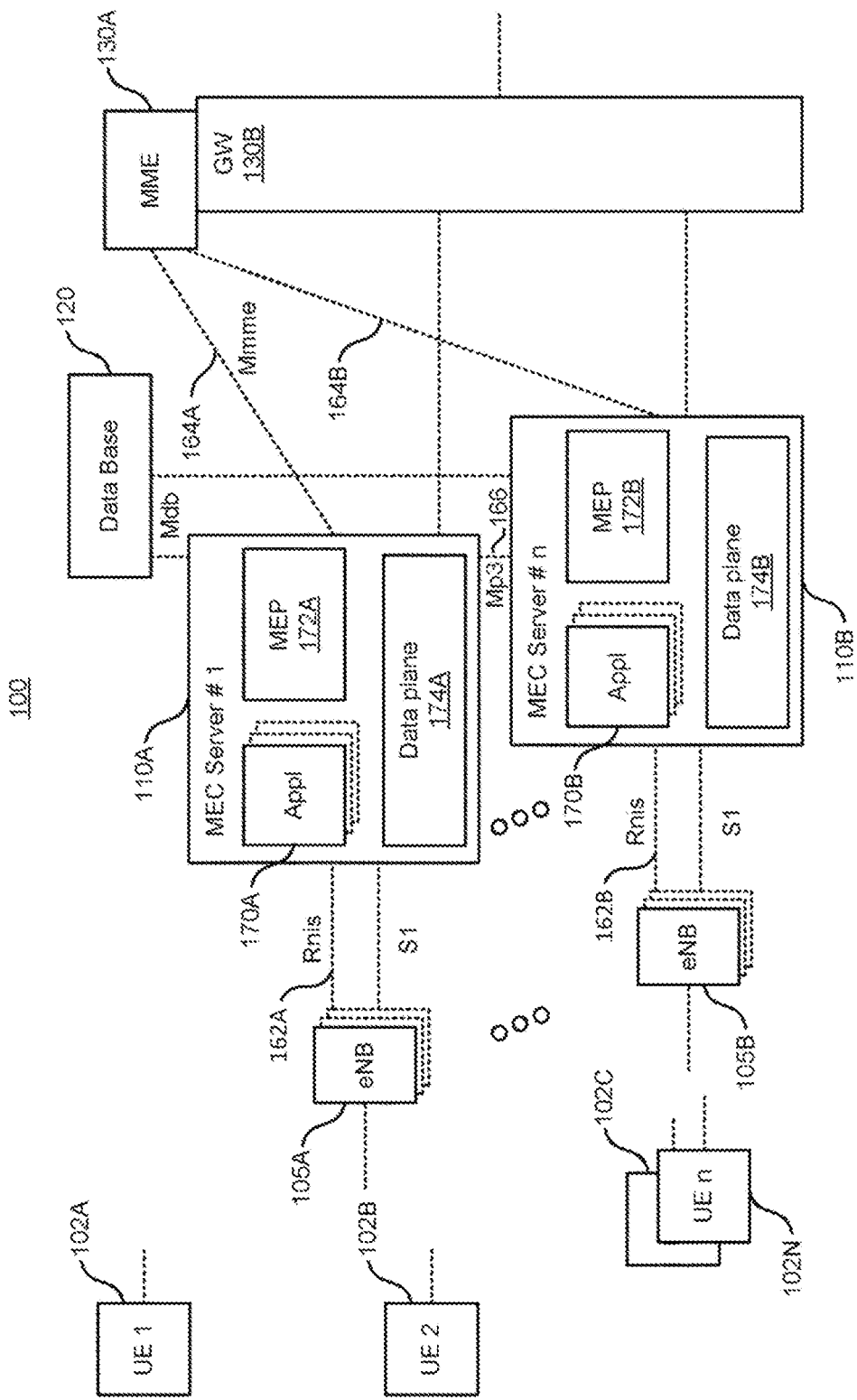
FIG. 1 depicts an example of a system 100 including a mobile edge computing server, in accordance with some example embodiments.

Like labels are used to refer to same or similar items in the drawings.

DETAILED DESCRIPTION

When a user equipment (UE) does not have a user session "on" such as active, the UE may be considered to be in an idle state. Indeed, it can be common for a UE to spend some, if not most, of the time in this idle state. When the idle state UE moves from a first coverage area served by a first base station, such as an evolved Node B (eNB) base station and/or the like, to a second coverage area served by a second base station, the network including the base stations may not have location information about the idle state UE's move. Rather than have information regarding the move, the network's location information for this UE may be outdated and thus inaccurate unless the UE leaves or enters a tracking area and thus reports to the network the exit or entry as part of a tracking area update. As such, the network's location information for the moving, idle state UE (which moves between base stations but does not leave the tracking area) may indicate the UE's last location at which the UE had an active user session (or active, connected state) to the network, rather than the UE's correct, current location.

Because of inaccurate location information as noted, when an application such as a mobile edge application sends a query to request a UE's location, the location information for the UE may be inaccurate and thus invalid. For example, the application may query a server, such as a mobile edge computing (MEC) server (also referred to as a MEC host) or a mobile edge platform (MEP) in order to obtain location information regarding the UE, but as noted the network may not have accurate location information due to the idle state, move condition noted above. When the application subscribes to information about a UE exiting and/or entering a coverage area being served by a base station/access point (see, e.g., MEC location service), the MEC server/MEP may not be able to report events related to the exiting or entering of the coverage area or base station/access point as the location of the UE may not be accurately followed by the network as noted above.

FIG. 1 depicts an example of a system 100, in accordance with some example embodiments.

The system 100 may include one or more UE 102A-N, one or more base stations (labeled eNBs) 105A-B, one or more servers, such as MEC servers 110A-B (also referred to as MEC hosts), a common or shared database 120 (e.g., a shared data layer (SDL) solution for the MEC servers), a mobility management entity (MME) 130A, and/or a gateway (GW) 130B.

Although some of the examples refer to mobile edge computing, the example embodiments described herein may be practiced in other types of frameworks as well. Moreover, although FIG. 1 depicts an example system 100, the system is merely used as an example as other types of systems and system architectures may implement the subject matter disclosed herein.

The MEC servers 110A-B may each include a MEP 172A-B, one or more applications 170A-B, and a data plane 174A-B which may also provide a virtualization platform for the applications 170A-B. The applications 170A-B may represent mobile edge application being run out of the MEC server (and in particular a virtualization platform at the MEC server). The MEP 172A-B may be configured to provide a variety of functions and services including hosting mobile edge services, including software as a service, providing access to persistent storage, and/or providing other services and/or functions in accordance with one or more of the MEC standards.

In some example embodiments, the MEC server 172A may interface a base station via at least a first interface 162A, such as a radio network information service interface (RNIS). Alternatively or additionally, the MEC server 172A may interface the MME 130A via a second interface such as interface 164A.

In some example embodiments, a server such as MEC server 110A may receive information about a UE, such as UE 102A and/or the like, when the UE 102A performs a tracking area update (TAU) via base station 105A (which is under the MEC server 110A) and/or when the UE 102A attaches to the wireless network or radio access network. The MEP 110A may receive this information from a network node, such as the MME 130A and/or directly from the base station 105A (e.g., via a radio network information service interface, labeled RNIS 162A and/or via, an MME interface 164A, labeled Mmme).

In some example embodiments, the information received by the MEC server 110A/MEP 172A may include a user identifier (ID), a user equipment ID, a cell ID, and/or the UE's possible location information.

In some example embodiments, the information received by the MEC server 110A/MEP 172A may be made available to other MEC servers and/or MEPs that have the base station 105A in the tracking area (TA). This information received by the MEC server 110A/MEP 172A may be made available to the MEC servers/MEPs in a variety of ways. In some example embodiments, the information may be made available to the other MEPs/MEC servers through a common or shared database 120 (or other type of shared data layer (SDL)). Alternatively or additionally, the information may be made available to the MEPs/MEC servers by signaling messages exchanged between the entities (e.g., through the Mp3 interface 166). In this way, the MEP/MEC servers are able to know the UEs (or users associated with a UE) in a given tracking area, which the MEC servers/MEPs belong to.

In some example embodiments, the MEP/MEC server may follow and record information for certain UEs (or users associated with a UE) based on UE (or user) related information received from applications 170A-B using the location services offered by the MEP and/or MEC server.

When application 170A needs a certain UE's (which is in a zone or tracking area under/covered by base station 105A and a corresponding MEC server 110A) location information, the application 170A may send a query or subscription to the MEP 172A, in accordance with some example embodiments. This query or subscription may include: one or more user IDs (which may take the form of an anonymous customer reference (ACR)); and/or a class or category ID which can be used to address a certain type or quantity of users/UEs under the MEC server or address all users/UEs under the MEC server. To limit the query or subscription to an indicated zone (e.g., a coverage area, cell identifier(s), geographic area, tracking area, and/or the like) and/or access point, the query or subscription may also include defined zone(s) and/or defined access point(s).

In some example embodiments, a query or subscription may include or indicate instructions and/or preferred formats, such as ways to express a UE's location when responding to the query or subscription. For example, the UE's location may be expressed as a cell ID, geographical coordinates, geographical coordinates and elevation, a distance from a given point, and/or in other ways as well.

In some example embodiments, a MEP, such as MEP 172A-B, may transform or change IDs such as the ACRs or class/category IDs into mobile network user or UE IDs (e.g., an international mobile subscriber identifier, a mobile station international subscriber directory number, an international mobile equipment identity and/or the like). The MEP may then send, using the mobile network's user or UE IDs, a paging request for "relevant" UEs (which may be sent via the MME and/or directly to "relevant" base stations under the MEC server). The relevant UEs may include for example some, if not all, UEs existing in the tracking area, or in a zone, if the application queries or subscribes to all, or some, users/UEs. Alternatively or additionally, the relevant UEs may include a certain or limited quantity of UEs if the query or subscription from the application limits the users/UEs in some way. In this example, the relevant base stations may include some, if not all, base stations under the MEC server and belonging to the tracking area, when the query or subscription from the application does not contain any zone or access point information. Alternatively or additionally, the relevant base stations may include a certain or limited quantity of base stations connected to the MEC server, when the query or subscription from the application contains zone and/or access point information. In the case of a limited quantity, the paging request may be sent only to the base stations that cover (at least partly) the indicated zone and/or access point.

In some example embodiments, the paging request noted above may be optimized for location purposes. For example, the paging request may for example indicate that only location service related data, such as an identifier of the user or UE, location information, and a time stamp should be provided to the MEC server/MEP when responding to the page/paging.

In some example embodiments, MEC server/MEP may use a variety of information to deduce to which users and/or UEs to send the paging request. For example, the server, such as the MEC and/or MEP, may use one or more of the following to determine which UEs (or associated users) should receive, or be excluded from, a page/paging:

do not page when information indicates a UE recently (or as their latest but recent tracking area update (TAU)), made a TAU via a sufficiently distant base station as the UE is most likely not in the area of the given MEC server;

do not page when information indicates that a UE recently attached to the network via a sufficiently distant base station as the UE is most likely not in the area of the given MEC server;

do page when UEs that are in the tracking area and are wanted or indicated by the application 170A to be paged or tracked (a to-be-paged UE may be in a certain class or category of UEs); and/or do page all UEs in the tracking area of a given MEC server.

In some example embodiments, when the MEC server/MEP receives a query request from an application such as a mobile edge application, the MEP may delay sending paging requests for a given period of time to enable combining other queries/requests from other applications into the same paging request(s). For example, the delay may be determined by the MEP based on network conditions, based on a mobile operator's configuration, and/or an allowed, or maximum, delay (which may be received from the application via the query or subscription).

In some example embodiments, when the MEP receives or acquires user or UE information based on a subscription from an application such as application 170A, the MEP may use different pieces of information to define the time(s) (e.g., periods, intervals, and/or the like) for sending paging requests to the zones or access points defined by the subscription. The different pieces of information may include for example one or more of the following: network conditions; operator configuration; timing; a time window (e.g., time of day); an allowed, or maximum, delay as indicated by for example the application; and/or the like.

In some example embodiments, the location paging request sent to a UE may include instructions and/or preferred formats or ways to express the UE's location when responding to the page. For example, the paging request may indicate that the UE's location information should be reported as one or more of the following: a cell ID; geographical coordinates; geographical coordinates and elevation; a distance from a given point; and/or in other formats providing or indicating the UE's location.

The UE may camp on a base station connected to, or under the management of, a given MEC server. When this is the case, the camped UE may receive the paging request and may respond by indicating UE location (e.g., using for example a cell ID). To minimize signaling load in the network, the camped UE may be configured to, in accordance with some example embodiments, respond to the location paging request only if its location (e.g., cell ID, and/or the like) has changed since its previous or latest location reporting to the network. As noted above, the UE may indicate its location in a variety of ways including cell ID, geographical coordinates, geographical coordinates and elevation, distance from a given point, and/or the like. The format or type of location information provided by the UE may be determined based on the capabilities of the UE itself, the instructions/parameters received by the UE in the location paging request, and/or the instructions provided by a user of the UE.

In some example embodiments, the MEC server and/or MEP may be able to process the received mobile network's user or UE IDs into ACRs. For example, when the mobile network's user ID or UE ID are not allowed to be provided to an application such as application 170A, the MEP may determine the ACR for the user or UE and may then report the user/UE's location and the UE's ACR to the application 170A.

Figure 2:
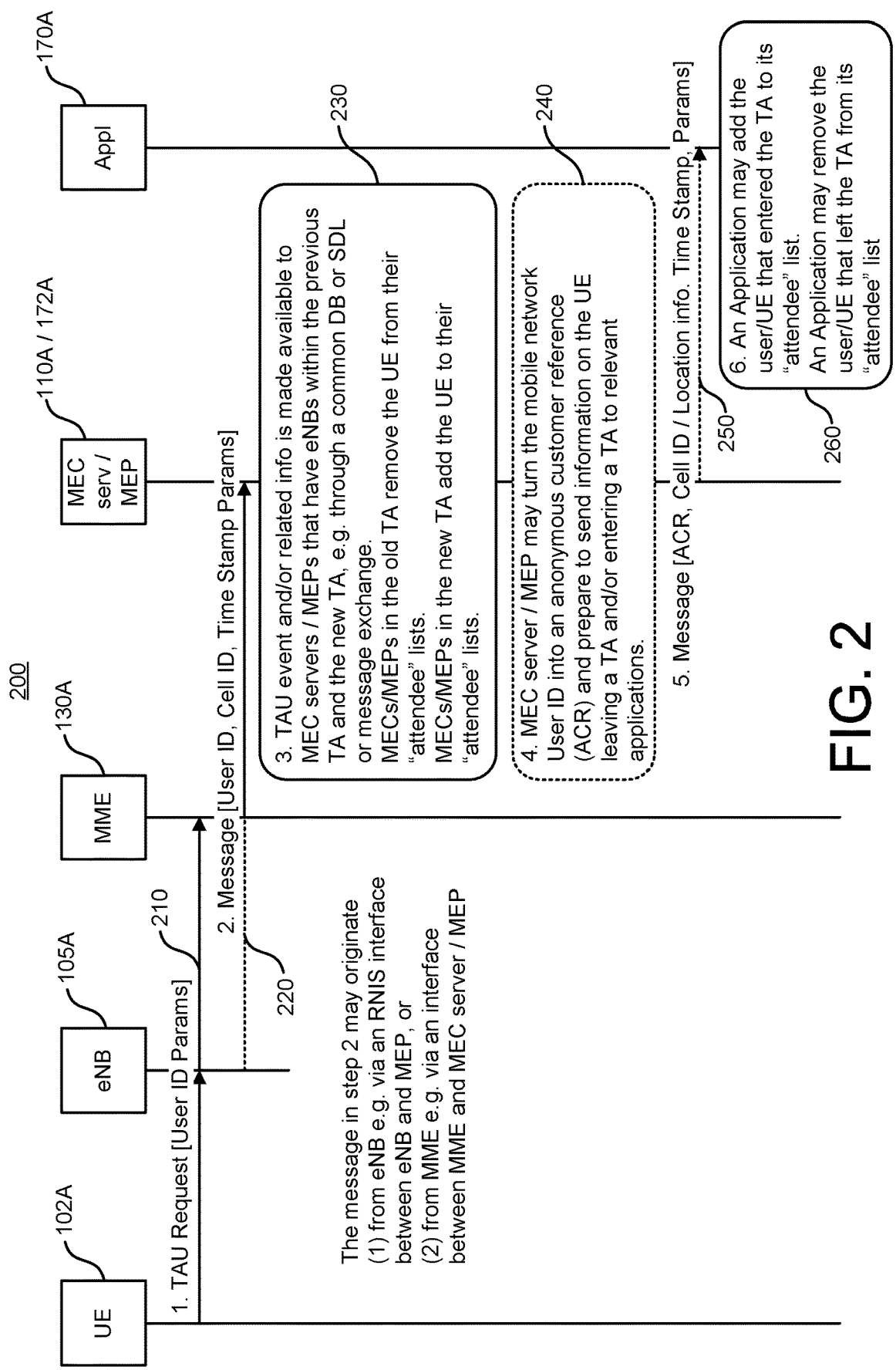
FIG. 2 depicts an example of a signaling diagram for a traffic area update, in accordance with some example embodiments.

FIG. 2 depicts a signaling diagram 200 for performing a traffic area update in a network including a MEC server, in accordance with some example embodiments. The signaling diagram depicts the UE 102A, base station (labeled eNB) 110A, MME 130A, MEC server 110A, MEP 172A, and a mobile edge application such as application 170A described above with respect to FIG. 1.

At 210, the UE 102A may send a tracking area update request message to base station 105A and the MME 130A, in accordance with some example embodiments. The tracking area update request message may indicate the identity of the UE (or user associated with the UE) as well as other parameters. For example, when UE 102A enters or exits a tracking area, this may trigger a tracking area update message to be sent to the base station. Although the example of FIG. 2 describes the message at 210 indicating a tracking area event, the message at 210 may, alternatively or additionally, be triggered by other types of events, such as when the UE attaches to a base station or access point. Although the message at 210 is referred to in the example as a tracking area event message, other types of messages may be used as well including, for example, an attach request and/or any other message type that can indicate the UE entering or exiting a tracking area and/or attaching/detaching from an access point.

At 220, the base station 105A (which may be under a MEC server 110A) may send a message to the MEC server 110A including MEP 172A, in accordance with some example embodiments. This message may include information such as the user ID, UE ID, cell ID, a time stamp, and/or other parameters, in accordance with some example embodiments. This message may allow the base station 105A to notify the MEC server 110A/MEP 172A of a tracking area update event (e.g., that the UE 102A has either exited or entered a tracking area that includes base station 105A).

At 230, the MEC server 110A including MEP 172A may make the tracking area update event information available to other MEC servers, in accordance with some example embodiments. For example, the MEC server 110A including MEP 172A may use a common or shared database (or shared data layer) and/or a messaging exchange to notify other MEC servers, such as MEC server 110B, MEP 172B and/or the like. The MEC server 110A including MEP 172A may notify those other MEC servers/MEPs that have base stations associated with the prior tracking area and/or the new tracking area. In this way, the MEC servers/MEPs have information regarding the zones or access points that the UE 102A has exited or entered as indicated by the tracking area update. In the case of an exit, the MEC servers/MEPs may delete the UE 102A as being in or attending their tracking area, while in the case of an entry, the MEC servers/MEPs may add the UE as being in or attending their tracking area.

At 250, the MEC server 110A including MEP 172A (as well as other MEC servers/MEPs) may indicate to the application 170A whether UE 102A has exited or entered the tracking area, in accordance with some example embodiments. For example, the MEC server 110A including MEP 172A may change the mobile network's user or UE ID into another form, at 240, such as an ACR. Thus, at 250 the MEC server 110A including MEP 172A may send the UE's ACR along with the UE's location information, a time stamp, and other parameters to mobile edge application 170A. At 260, the application 170A may update its list ("attendee list") of which UE's such as UE 102A are in its tracking area by adding the user or UE ID that have entered or by deleting the user or UE ID that have exited the tracking area, in accordance with some example embodiments.

Figure 3:
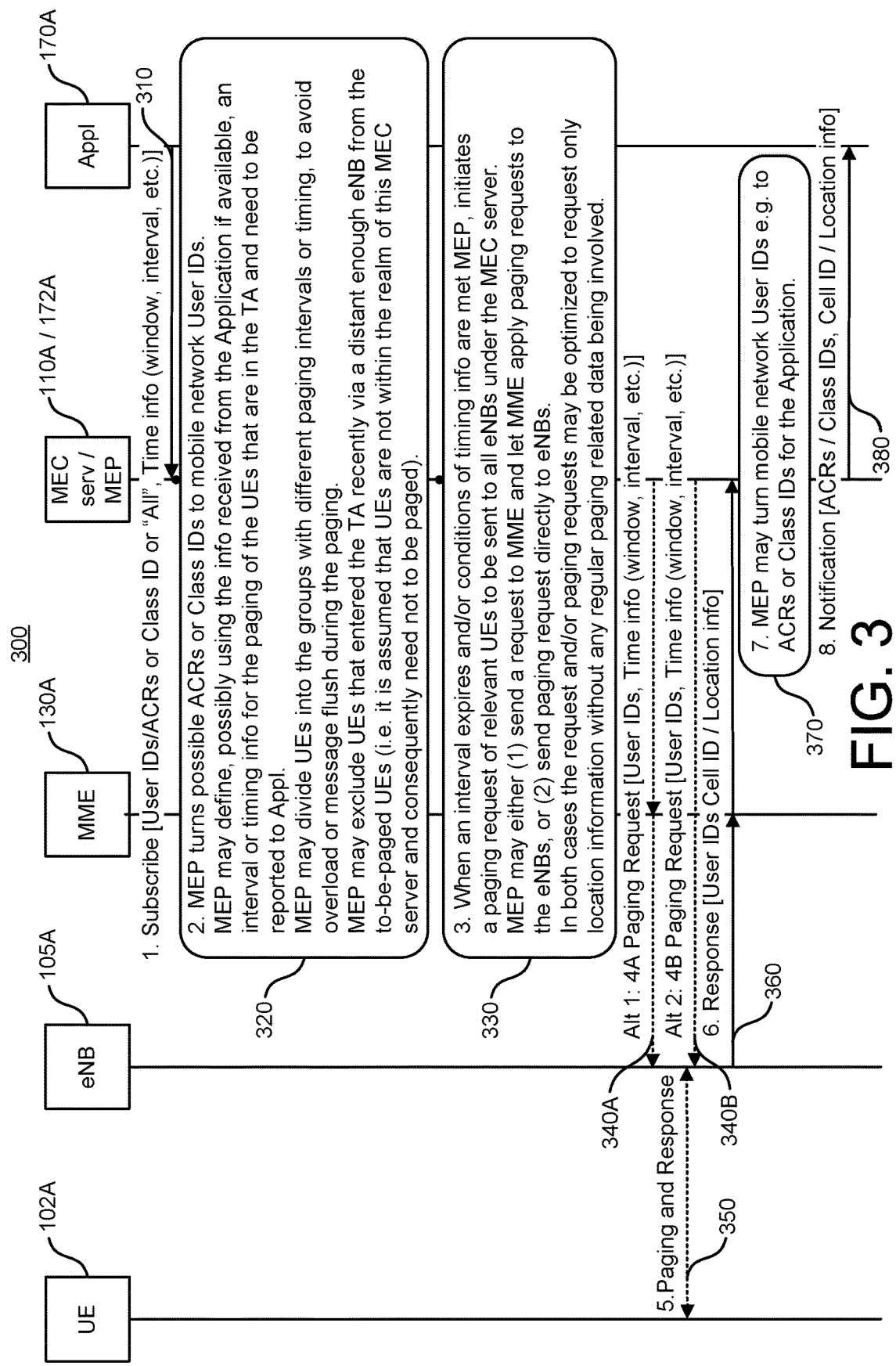
FIG. 3 depicts an example of a signaling diagram for an application subscribing to notifications regarding a UE location change, in accordance with some example embodiments.

FIG. 3 depicts a signaling diagram 300 for an application subscribing to UE location change notifications, in accordance with some example embodiments. The signaling diagram depicts the UE 102A, base station 105A, MME 130A, MEC server 110A, MEP 172A, and application 170A described above with respect to FIG. 1.

At 310, mobile edge application, such as application 170A, may subscribe to UE location change notifications, in accordance with some example embodiments. For example, application 170A may send a subscription message to MEC server 110A including MEP 172A. This subscription message may identify the user, UE, class of users or UEs, and/or all users or UEs, as well as a time interval or window over which the subscription request is valid, or to be used for defining the paging or reporting cadence or timing. In some instances, the application 170A may, as noted, specify a certain class of users or UEs or specify all users or UEs in a zone defined by the application or covered by the MEC server including MEP 172A.

At 320, the MEP 172A may determine, from the ACRs or class IDs, the mobile network's user ID, in accordance with some example embodiments. Alternatively or additionally, the MEP 172A may define a time, such as an interval or period, over which the UEs in the tracking area should be paged and responses reported to the application 170A, or to be used for defining the paging or reporting cadence or timing. The time may be determined based on the subscription message 310 (or the contents of that message), although the time may be determined in other ways as well. Alternatively or additionally, the MEP 172A may divide UEs into different groups, so that paging is performed on groups of UEs. Alternatively or additionally, the MEP 172A may exclude and thus not page certain UEs if, as noted above, the UEs are likely to no longer be within the area of a given MEC server including MEP (e.g., not camped on a base station such as eNB base station connected to the MEC server).

At 330, the MEP 172A may initiate paging of relevant UEs served by base stations, in accordance with some example embodiments. For example, the MEP 172A may initiate paging request to any relevant UEs being served by the base stations under MEC server 110A, when the conditions or timing indicate a paging request can be sent. The MEP 172A may initiate the paging request by sending, at 340A, a request(s) to the MME 130A which would trigger paging requests to the base stations and/or by sending, at 340B, a paging request directly to the base stations. At 350, the base station 105A may send pages to relevant UEs, and receive a page response. The page response may be configured to provide user and/or UE identification information and the UE's location information, and the page response may be optimized for providing location information to the mobile edge application (so some information which may typically be included in a page response may be excluded to provide this optimization).

At 360, the base station 105A may forward the page response to the MME 130A and/or MEC server 110A, in accordance with some example embodiments. For example, the response at 360 may include at least one user ID and a corresponding location information (e.g., cell ID and/or the like) for that UE or user.

At 370, the MEP 172A may turn the mobile network's IDs (received at 360) into ACRs or class IDs for the application 170A, in accordance with some example embodiments. At 380, the MEP 172A may send a notification to the application 170A, in accordance with some example embodiments. This notification may include the ACRs or Class IDs along with the location information for the user or UE, in accordance with some example embodiments. To turn a mobile network's ID into an ACR or class ID (and vice versa), a node, such as the MEP or MEC server may have a mapping, such as a table, to provide the conversion.

Figure 4:
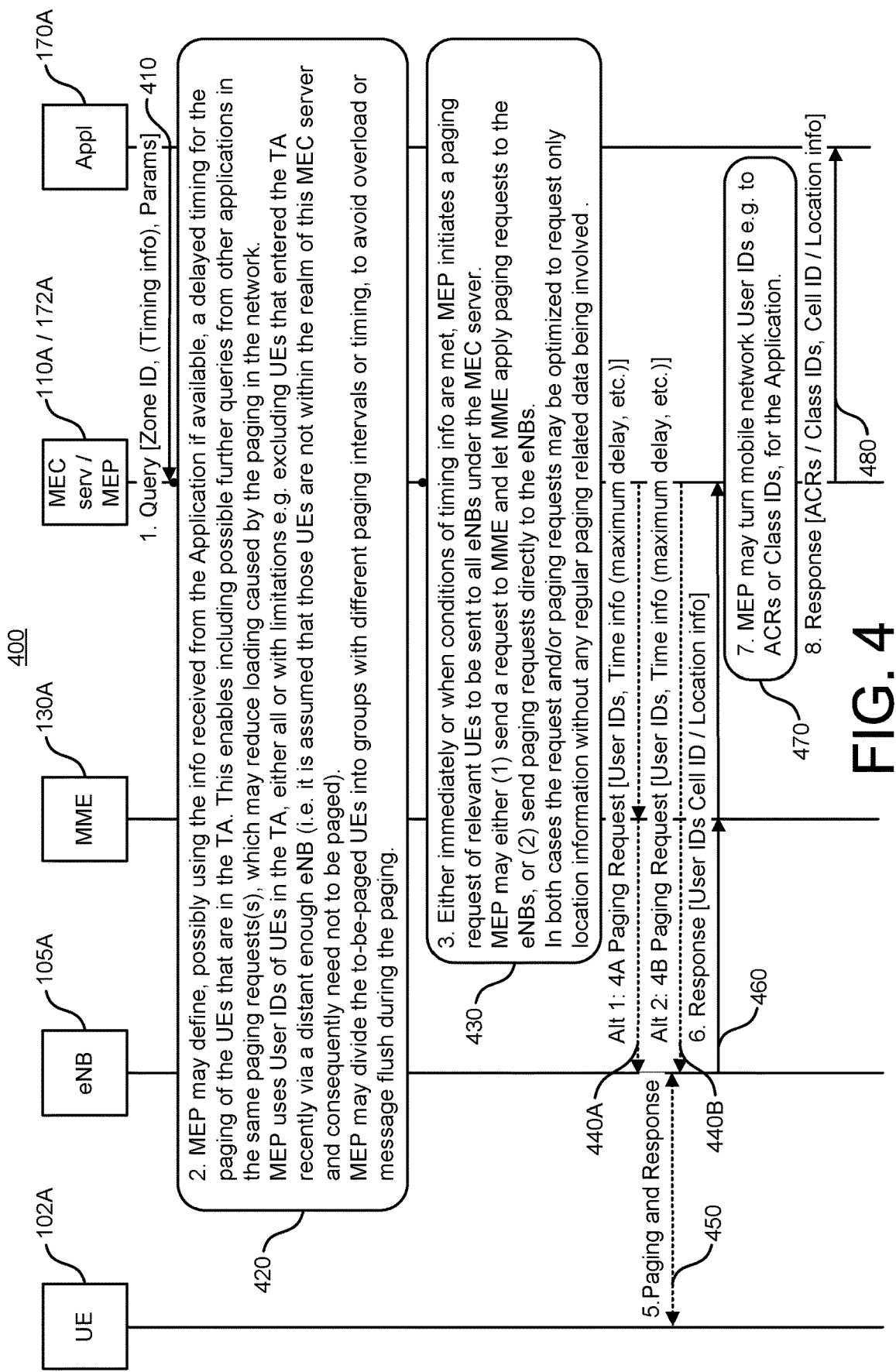
FIG. 4 depicts an example of a signaling diagram for an application querying for some, if not all, UEs in a given zone associated with a mobile edge computing server, in accordance with some example embodiments.

FIG. 4 depicts a signaling diagram 400 for a mobile edge application such as application 170A making a query on some, if not all, UEs within a zone, in accordance with some example embodiments. The signaling diagram depicts the UE 102A, base station 105A, MME 130A, MEC server 110A, MEP 172A, and application 170A described above with respect to FIG. 1.

Figure 5:
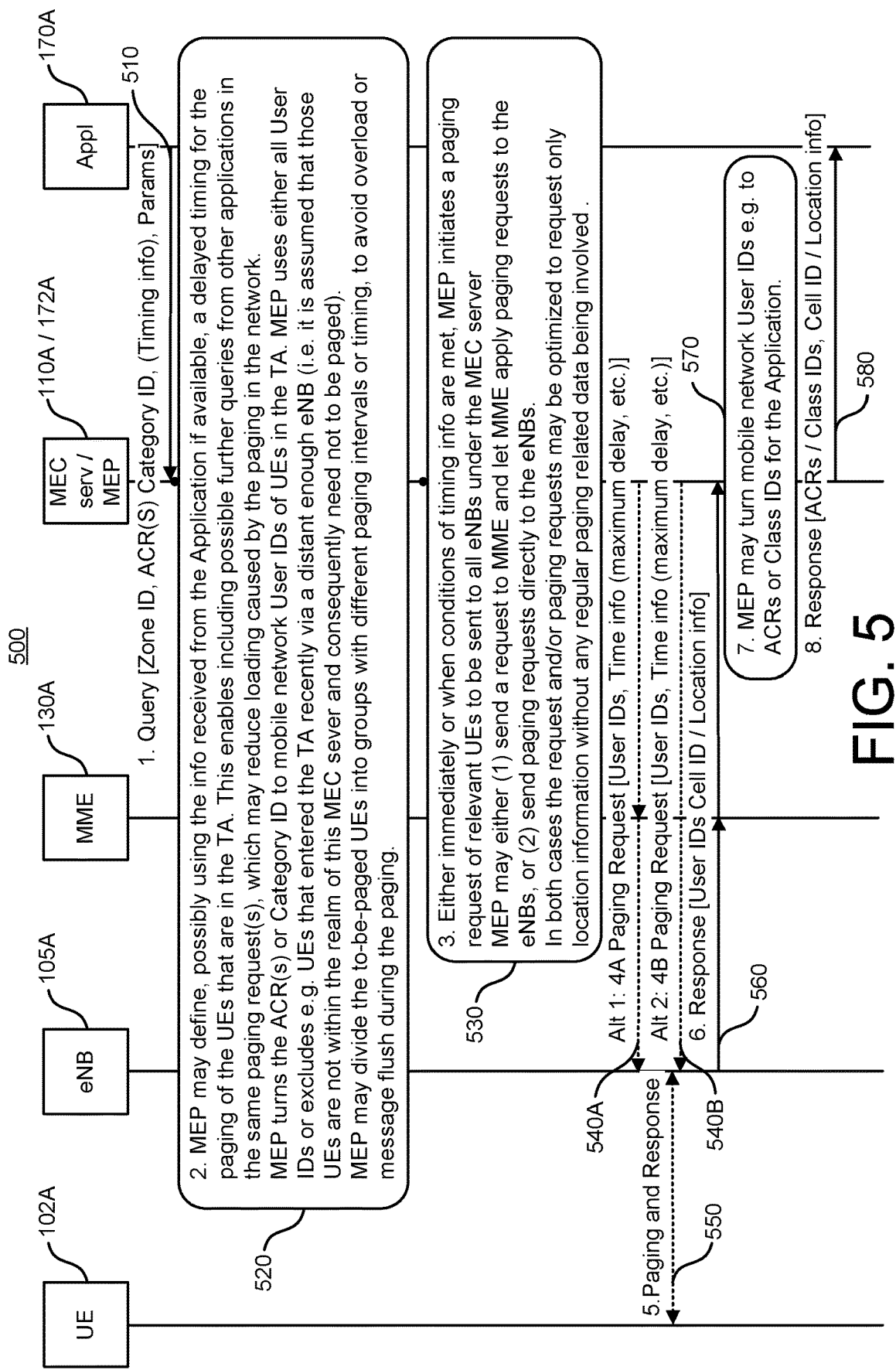
FIG. 5 depicts an example of a signaling diagram for an application querying for a certain UE or a class of UEs in a given zone associated with a mobile edge computing server, in accordance with some example embodiments.

At 410, a mobile edge application such as application 170A may send a query to the MEC server 110A including MEP 172A, in accordance with some example embodiments. The query may request some, if not all, UEs within the zone covered by the MEC server. In the example of FIG. 5, the query request 410 may include a zone ID indicating the zone, timing information for the request, and/or other parameters as well. The phrase "tracking area" refers to an area (which may be defined by an operator) in a mobile network. A UE entering or exiting a tracking area may report the event to the mobile network. On the other hand, the term "zone" also refers to an area (e.g., of one or more radio cells, a geographical area, and/or the like); however, the zone may be defined by an application such as the mobile edge application, rather than the mobile network operator. Suppose for example, an application advertises products to people roaming in a shopping mall. In this example, the zone may be defined by, or for, the application as a few radio cells for example, near certain shops in the mall.

In some example embodiments, the MEC server 110A including MEP 172A may, at 420, define a delay for paging the UEs that are in the zone associated with the MEC server. For example, the MEP 172A may, based on the information received at 410, determine the delay. This delay may be selected to enable other applications to send queries, so that the MEP 172A can consolidate paging requests. Alternatively or additionally, the MEP 172A may, based on the user/UE IDs in the zone or tracking area, identify the users or UE to be paged in order to obtain their location. In some example embodiments, the MEP 172A may seek to page some, if not all, UEs in the zone or tracking area, while certain UEs may be excluded (e.g., UEs likely to be outside the area of the MEC server). Alternatively or additionally, the MEP 172A may group the UEs into paging groups, so that groups of UEs can be paged together.

At 430, the MEP 172A may initiate the paging request(s) for relevant UEs served by base stations, in accordance with some example embodiments. For example, the MEP 172A may initiate paging requests to some, if not all, relevant UEs in the zone. To that end, MEP 172A may initiate the paging by sending, at 440A, a request(s) to the MME 130A which would trigger paging requests to the base station(s) and/or by sending, at 440B, a paging request directly to the base station(s). At 450, the base station 105A may send the page(s) to one or more relevant UEs, and receive the page response(s).

At 460, the base station 105A may forward the page response(s) to the MME 130A and/or MEC server 110A, in accordance with some example embodiments. At 470, the MEP 172A may turn the mobile network's IDs (received at 460) into ACRs or class IDs for the application 170A, and then send at 480 a response to the original query from application 170A by providing the location information for the user or UE as well as for example, ACRs, and/or class IDs, in accordance with some example embodiments.

FIG. 5 depicts a signaling diagram 500 for a mobile edge application such as application 170A making a query on a certain UE or category of UEs within a zone, in accordance with some example embodiments. The signaling diagram depicts the UE 102A, base station 105A, MME 130A, MEC server 110A, MEP 172A, and application 170A described above with respect to FIG. 1.

At 510, a mobile edge application such as application 170A may send a query to the MEC server 110A including MEP 172A, in accordance with some example embodiments. The query may request, for a given zone (which may be identified by zone ID), a certain UE or a category or class of UEs. In the case of a certain UE, the query may specify one or more UEs based on their ACRs, although the UEs (or user's associated with the UEs) may be identified in other ways as well. In the case of a certain category of UEs, the query may include a category ID (also referred to as a class ID), although the category of UEs (or user's associated with the UEs) may be identified in other ways as well. The query may also include time information regarding the timing associated with the query request or page as well as other parameters.

At 520, the MEC server 110A including MEP 172A may define a delay for paging the UEs that are in the zone, as explained at 420 above. Moreover, the MEP 172A may determine, from the ACRs or category IDs, the mobile network's ID for the UEs in the zone, in accordance with some example embodiments. Alternatively or additionally, the MEP 172A may, based on the mobile network's user/UE IDs in a given zone, identify the users or UEs to be paged. The MEP 172A may exclude from paging certain UEs (e.g., UEs likely to be outside the area of the MEC server). Alternatively or additionally, the MEP 172A may group the UEs into paging groups.

At 530, the MEP 172A may initiate paging of one or more relevant UEs served by base station(s), in accordance with some example embodiments. To that end, the MEP 172A may initiate paging requests to some, if not all, relevant UEs in the zone by sending, at 540A, the request(s) to the MME 130A which would trigger paging requests to the base stations and/or by sending, at 540B, the paging request(s) directly to the base stations. At 550, the base station 105A may send pages to relevant UEs, and receive a page response.

At 560, the base station 105A may forward the page response to the MME 130A and/or MEC server 110A, in accordance with some example embodiments. The page response may include mobile network user IDs, cell IDs, location information, and/or other parameters. At 570, the MEP 172A may turn the mobile network's IDs (received at 560) into ACRs or class IDs for the application 170A, and then at 580 respond to the original query from application 170A by providing the location information for the user or UE as well as for example, ACRs, and/or class IDs, in accordance with some example embodiments.

The reporting to a MEC server of the UE entering or exiting a tracking area may be implemented in a variety of ways. For example, there may be an interface 164A or B, between the MME and MEC server, and MME may send the information to the MEC server(s). Alternatively or additionally, there may be an interface 162A or B, between the base station and MEC server, and base station may send the information to the MEC server over the RNIS interface. In both cases, the interfaces 164A-B and/or 162A-B may be an RNIS (radio network information service) related interface.

The sending of the location paging request may be implemented in a variety of ways. For example, the MEC server/MEP may send a request to MME and have the MME apply the existing paging request procedures, which may be augmented with additional information and/or parameters as disclosed herein. When this is the case, the MEC server/MEP may also indicate to the MME which base stations(s) to send the paging request(s) to. Alternatively or additionally, the MEC server/MEP may send the paging request(s) directly to the relevant base stations. An RNIS interface between the MEC server/MEP and the base station may be used for handling the paging request.

Figure 6:
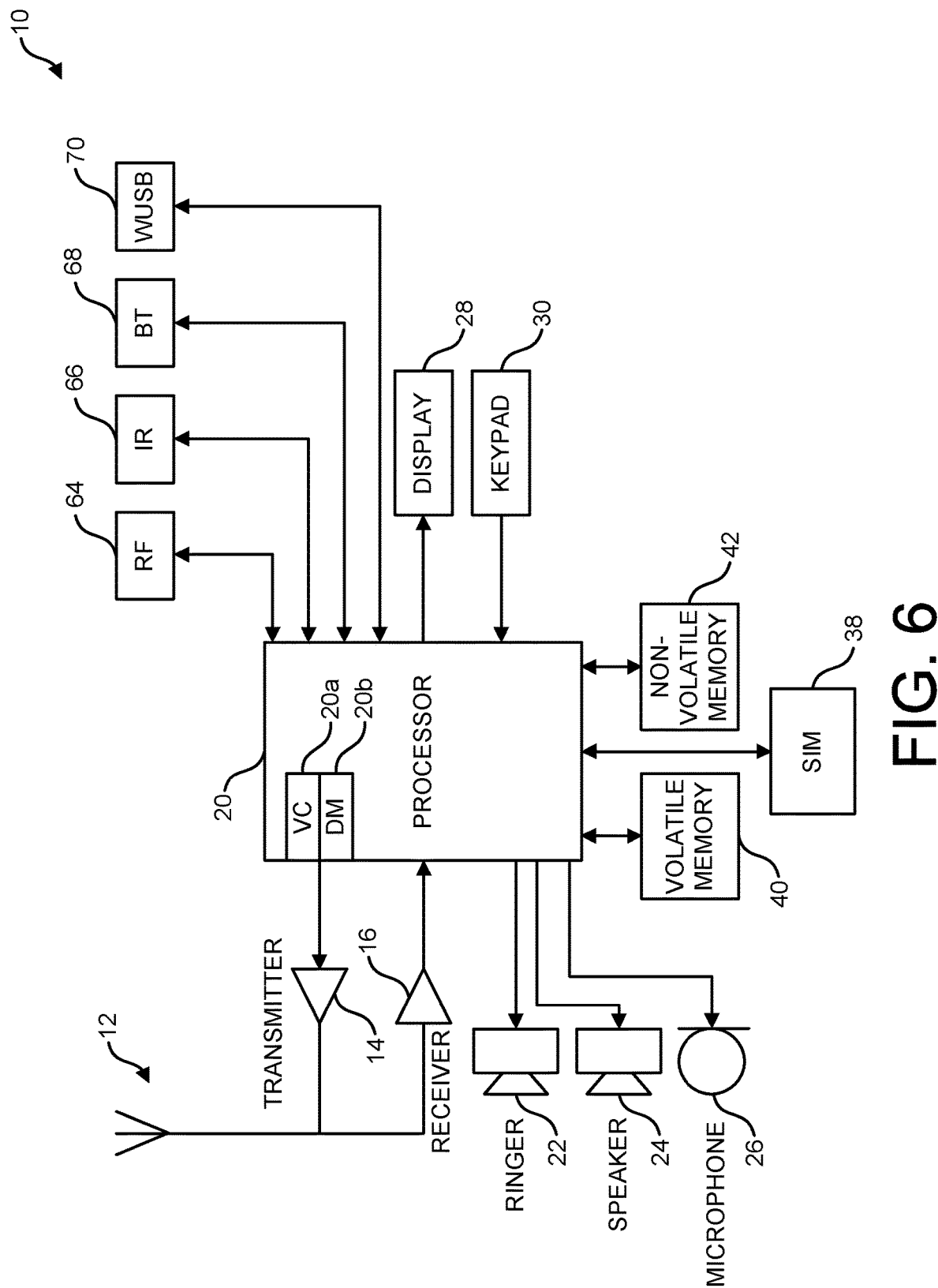
FIG. 6 depicts an example of a radio, in accordance with some example embodiments.

FIG. 6 illustrates a block diagram of an apparatus 10, in accordance with some example embodiments. The apparatus 10 may be implemented at the UE, such as a smartphone cell phone, tablet, IoT device, and/or other processing device. The apparatus may also provide aspects of the base station, while the processor and memory including program code (alone or with other components of apparatus 10) may be configured to provide the MEC server.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 10 may include a location processor and/or an interface to obtain location information, such as positioning and/or navigation information. Accordingly, although illustrated in FIG. 6 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

As shown in FIG. 6, apparatus 10 may also include one or more mechanisms for sharing and/or obtaining data. Moreover, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example within 10 meters. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory, and/or the like. Like volatile memory 40, non-volatile memory 42 may include a cache area for temporary storage of data. At least part of the volatile and/or non-volatile memory may be embedded in processor 20. The memories may store one or more software programs (for example, an application and/or user interface associated with personal communications via local vehicle-to-vehicle links), instructions, pieces of information, data, and/or the like which may be used by the apparatus for performing functions of the user equipment/mobile terminal. The memories may comprise an identifier, such as for example an international mobile equipment identification (IMEI) code, capable of uniquely identifying apparatus 10. The functions may include one or more of the operations disclosed herein, such as for example the functions disclosed at processes 200-500. The memories may comprise an identifier, such as for example, an international mobile equipment identification (IMEI) code, capable of uniquely identifying apparatus 10. In the example embodiment, the processor 20 may be configured using computer code stored at memory 40 and/or 42 to provide processes 200-500, and/or the like as disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example a computer or data processor circuitry. A computer-readable medium may comprise a non-transitory computer-readable storage medium that may be any media that can contain or store the instructions for use by or in connection with an instruction execution system, apparatus, or device, such as for example a computer. Furthermore, some of the embodiments disclosed herein include computer programs configured to cause operations as disclosed herein (see, for example, processes 200-500 and/or the like).

Without in any way limiting the scope, interpretation, or application of the claims appearing below, a technical effect of one or more of the example embodiments disclosed herein is enhanced performance of applications implemented as mobile edge application as well as enhanced location services to those applications.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:
1. An apparatus comprising:
   at least one processor; and
   at least one memory including computer program code,
      the at least one memory and computer program code configured to, with the at least one processor, cause the apparatus to at least:
      receive, from a base station or a mobility management entity for at least one user equipment, an indication of a tracking area update and/or an attachment to a radio access network, the indication comprising at least one of a user identifier, a user equipment identifier, a cell identifier, and location information;
      provide the indication about the at least one user equipment to at least one other apparatus, the indication provided via a shared database and/or via signaling to the at least one other apparatus;

receive, from a mobile edge application at the apparatus, a request for location information for the at least one user equipment in a zone of coverage associated with the apparatus; and send, to the mobile edge application, the requested location information.

2. The apparatus of claim 1, wherein the at least one memory and computer program code are further configured to cause the apparatus to at least:

determine a mobile network identifier from an identifier included in the request for location information.

3. The apparatus of claim 2, wherein the identifier comprises an anonymous customer reference and/or a category identifier, and wherein the mobile network identifier comprises an international mobile subscriber identifier, a mobile station international subscriber directory number, and/or an international mobile equipment identity.

4. The apparatus of claim 1, wherein the request for location information includes a defined zone and/or a defined access point to limit the request for location information to the at least one user equipment in the defined zone and/or connected to the defined access point.

5. The apparatus of claim 1, wherein the at least one memory and computer program code are further configured to cause the apparatus to at least:

initiate a page to the at least one user equipment in the zone of coverage associated with the apparatus.

6. The apparatus of claim 5, wherein the at least one memory and computer program code are further configured to cause the apparatus to at least:

exclude, from the page, one or more user equipment likely to be outside of the zone of coverage associated with the apparatus.

7. The apparatus of claim 5, wherein the at least one memory and computer program code are further configured to cause the apparatus to at least:

delay initiation of the page to enable at least one other mobile edge application to request location information.

8. The apparatus of claim 5, wherein the page indicates a way to respond to the page, the way to respond including an identifier for the at least one user equipment in the zone of coverage associated with the apparatus, the location information, and/or a time stamp.

9. The apparatus claim 5, wherein the at least one memory and computer program code are further configured to cause the apparatus to at least:

receive, in response to the page, the location information for the at least one user equipment in the zone of coverage associated with the apparatus.

10. The apparatus of claim 9, wherein the at least one memory and computer program code are further configured to cause the apparatus to at least:

determine, from a mobile network identifier included in the response to the page, an anonymous customer reference and/or a category identifier.

11. The apparatus of claim 9, wherein the location information is determined based on the response to the page.

12. The apparatus of claim 1, wherein the apparatus comprises or is comprised in a mobile edge computing server and/or a mobile edge computing platform.

13. A method comprising:

receiving, at a first mobile edge computing server from a base station or a mobility management entity for at least one user equipment, an indication of a tracking area update and/or an attachment to a radio access network, the indication comprising at least one of a user identifier, a user equipment identifier, a cell identifier, and location information;

providing, by the first mobile edge computing server, the indication about the at least one user equipment to at least one other mobile edge computing server, the indication provided via a shared database and/or via signaling to the at least one other mobile edge computing server;

receiving, at the first mobile edge computing server from a mobile edge application at the first mobile edge computing server, a request for location information for the at least one user equipment in a zone of coverage associated with the first mobile edge computing server; and sending, to the mobile edge application, the requested location information.

14. The method of claim 13, further comprising:

determining a mobile network identifier from an identifier included in the request for location information.

15. The method of claim 13, wherein the request for location information includes a defined zone and/or a defined access point to limit the request for location information to the at least one user equipment in the defined zone and/or connected to the defined access point.

16. The method of claim 13, further comprising:

initiating a page to the at least one user equipment in the zone of coverage associated with the first mobile edge computing server.

17. The method of claim 16, further comprising:

delaying initiation of the page to enable at least one other mobile edge application to request location information.

18. The method of claim 16, further comprising:

receiving, in response to the page, the location information for the at least one user equipment in the zone coverage associated with the first mobile edge computing server.

19. The method of claim 18, further comprising:

determining, from a mobile network identifier included in the response to the page, an anonymous customer reference and/or a category identifier.

20. The method of claim 18, wherein the location information is determined based on the response to the page.

21. A non-transitory computer-readable storage medium including computer program code which, when executed by at least one processor, causes operations comprising:

receiving, at a first mobile edge computing server from a base station or a mobility management entity for at least one user equipment, an indication of a tracking area update and/or an attachment to a radio access network, the indication comprising at least one of a user identifier, a user equipment identifier, a cell identifier, and location information;

providing, by the first mobile edge computing server, the indication about the at least one user equipment to at least one other mobile edge computing server, the indication provided via a shared database and/or via signaling to the at least one other mobile edge computing server;

receiving, at the first mobile edge computing server from a mobile edge application at the first mobile edge computing server, a request for location information for the at least one user equipment in a zone of coverage associated with the first mobile edge computing server; and sending, to the mobile edge application, the requested location information.

\* \* \* \* \*